United States Patent
Takechi et al.

(10) Patent No.: US 9,861,086 B2
(45) Date of Patent: Jan. 9, 2018

(54) DRAG DEVICE FOR A DUAL-BEARING REEL

(71) Applicant: Shimano Inc., Sakai, Osaka (JP)

(72) Inventors: Kunio Takechi, Osaka (JP); Takeshi Ikuta, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/384,881

(22) Filed: Dec. 20, 2016

(65) Prior Publication Data

US 2017/0202194 A1    Jul. 20, 2017

(30) Foreign Application Priority Data

Jan. 20, 2016 (JP) .................................. 2016-009212

(51) Int. Cl.
    *A01K 89/01*    (2006.01)
    *A01K 89/033*   (2006.01)

(52) U.S. Cl.
    CPC ............ *A01K 89/05* (2015.05); *A01K 89/051* (2015.05); *A01K 89/053* (2015.05); *A01K 89/056* (2015.05)

(58) Field of Classification Search
    CPC .............. A01K 89/015; A01K 89/0179; A01K 89/018; A01K 89/0182; A01K 89/051; A01K 89/057
    See application file for complete search history.

(56) References Cited

U.S. PATENT DOCUMENTS

| | | | |
|---|---|---|---|
| 2014/0263791 A1* | 9/2014 | Sabtu .................. | A01K 89/01 242/224 |
| 2015/0129701 A1* | 5/2015 | Takechi ............... | A01K 89/033 242/268 |

FOREIGN PATENT DOCUMENTS

JP    2015-92830 A    5/2015

* cited by examiner

*Primary Examiner* — Emmaneul M Marcelo
(74) *Attorney, Agent, or Firm* — Global IP Counselors, LLP

(57) ABSTRACT

A drag device for a dual bearing reel includes a drag device, a sound generating member, and a housing member. The drag plate is integrally rotatable with the drive shaft, and is capable of being pressed by a drag adjustment member. The drag plate includes a sound generating plate opposed to the drive gear. The sound generating member includes a head portion configured to contact the sound generating plate, and a shaft portion connected to the head portion. The sound generating member is configured to generate a sound by interference between the sound generating plate and the head portion during relative rotation between the drive gear and the drag plate. The housing member is configured to be mounted to the drive gear and includes a holding portion to hold the shaft portion of the sound generating member, and a regulating portion configured to regulate movement of the head portion.

7 Claims, 7 Drawing Sheets

DRAG DEVICE FOR A DUAL-BEARING REEL

CROSS-REFERENCE TO RELATED APPLICATIONS

This application claims priority based on Japanese Patent Application No. 2016-009212, filed in the Japan Patent Office on Jan. 20, 2016, the contents of each of which are hereby incorporated herein by reference.

BACKGROUND

Field of the Invention

The present invention relates to a drag device for a dual-bearing reel, and especially relates to a drag device for a dual bearing reel that regulates the relative rotation between a drive gear and a drive shaft Background Information Generally, a drag device is disposed on a drive shaft of a dual hearing reel to brake the rotation of the spool in the casting (line delivering) direction. The drag device adjusts the torque transmitted between the drive gear and the drive shaft to suppress the tensile force that is applied to the fishing line.

The drag device comprises a drag adjustment member (star drag) and a drag plate that is integrally and rotatably mounted to the drive shaft. The drag plate is disposed on the drag adjustment member side of the drive gear, and is indirectly pressed by the drag adjustment member The rotation of the drive shaft in the casting direction is prohibited by the one-way clutch. Further, the drive gear can mesh with a pinion gear that is integrally and rotatably coupled with the spool.

A drag device having a sound generating system is known (for an example, refer to the Japanese Published Unexamined Application No. 2015-092830). A sound generating system detects an operation of the drag device and emits a sound when the spool is rotated in the casting direction against the drag force. A drag device having a sound generating system comprises a drag plate, a sound generating member, and a housing member.

The drag plate is capable of being integrally rotatable with the drive shaft, as well as capable of being pressed by a drag adjustment member. The drag plate comprises a sound generating plate that opposes the drive gear. The sound generating member comprises a head portion that can come into contact with the sound generating plate, and a shaft portion that is connected to the head portion. The sound generating member generates a sound by an interference of the sound generating plate and the head portion at the time of relative rotation between the drive gear and the drag plate. The housing member is formed in a substantially tubular shape. The housing member holds the shaft portion of the sound generating member and is mounted to the drive gear.

SUMMARY

In a conventional drag device, the shaft portion of the sound generating member is disposed in a tubular housing member and the head portion of the sound generating member is disposed between the housing member and the sound generating plate. In this state, when the head portion of the sound generating member interferes with the sound generating plate due to relative rotation between the drive gear and the drag plate, sound is generated by the interference.

In the drag device, the drag force is adjusted by the drag adjustment member pressing the drag plate and the drag plate pressing the drive gear. In particular, as the drag plate approaches the drive gear, the pressing force of the drag plate with respect to the drive gear is increased, increasing the drag force. On the other hand, as the drag plate separates from the drive gear, the pressing force of the drag plate with respect to the drive gear is reduced, reducing the drag force.

Here, when the pressing force of the drag plate with respect to the drive gear is reduced, that is, when the drag force is reduced, the drag plate is disposed in a position away from the drive gear. Accordingly, the sound generating plate of the drag plate is disposed in a position away from the drive gear. That is, if the drag force is set to be small, the gap between the sound generating plate of the drag plate and the housing member that is mounted to the drive gear is increased. In this state, if the head portion of the sound generating member interferes with the sound generating plate of the drag plate, the amount by which the shaft portion of the sound generating member protrudes from the housing member is increased, and there is a risk that the shaft portion of the sound generating member will fail out of the housing member.

The present invention is made in light of the problem described above, and an object of the present invention is to provide a drag device for a dual-bearing reel that is capable of reliably holding the sound generating member during a drag operation.

The drag device for a dual-bearing reel according to one aspect of the present invention regulates the relative rotation between the drive gear and the drive shaft. The drag device for a dual bearing reel comprises a drag plate, a sound generating member, and a housing member. The drag plate is configured to be integrally rotatable with the drive shaft, as well as capable of being pressed by a drag adjustment member. The drag plate comprises a sound generating plate that opposes the drive gear. The sound generating member comprises a head portion that can come in contact with the sound generating plate, and a shaft portion that is connected to the head portion. The sound generating member generates a sound by an interference of the sound generating plate and the head portion at the time of a relative rotation between the drive gear and the drag plate. The housing member is mourned to the drive gear. The housing member comprises a holding portion for holding the shaft portion of the sound generating member, and a regulating portion that regulates the movement of the head portion.

In the present drag device, the holding portion of the housing member holds the shaft portion of the sound generating member. In addition, the regulating portion of the housing member regulates the movement of the head portion of the sound generating member. According to such a configuration, the movement of the head portion of the sound generating member is regulated by the regulating portion of the housing member at the time of relative rotation between the drive gear and the drag plate, even when the gap between the drive gear and the sound generating plate of the drag plate is increased. Accordingly, the shaft portion of the sound generating member is less likely to fall out of the holding portion of the housing member. That is, the present drag device is capable of reliably holding the sound generating member during a drag operation.

In the drag device for a dual-bearing reel according to another aspect of the present invention, the holding portion preferably comprises a hole. In this embodiment, the shaft portion of the sound generating member is disposed in the hole of the holding portion. According to such a configuration, it is possible to reliably hold the shaft portion of the sound generating member. That is, the present drag device is capable of reliably holding the sound generating member during a drag operation.

In the drag device for a dual-bearing reel according to another aspect of the present invention, the regulating portion is preferably configured to be capable of regulating the movement of the head portion of the sound generating member in the circumferential direction. According to such a configuration, it is possible to reliably regulate the movement of the head portion of the sound generating member in the circumferential direction by the regulating portion, at the time of relative rotation between the drive gear and the drag plate. That is, the present drag device is capable of reliably holding the sound generating member during a drag operation.

In the drag device for a dual-bearing reel according to another aspect of the present invention, the regulating portion preferably comprises a pair of opposing surfaces that face each other in the circumferential direction. In this embodiment, the head portion of the sound generating member is disposed between a pair of opposing surfaces. According to such a configuration, it is possible to reliably regulate the movement of the head portion of the sound generating member in the circumferential direction by the pair of opposing surfaces, at the time of a relative rotation between the drive gear and the drag plate. That is, the present drag device is capable of reliably holding the sound generating member during a drag operation.

In the drag device for a dual-bearing reel according to another aspect of the present invention, the regulating portion preferably comprises a pair of protrusions. In this embodiment, the pair of protrusions protrude from the holding portion so as to face each other in the circumferential direction. Each of the pair of protrusions comprises opposing surfaces that face each other in the circumferential direction.

According to such a configuration, it is possible to reliably regulate the movement of the head portion of the sound generating member in the circumferential direction by the pair of protrusions, i.e., the pair of opposing surfaces, at the time of a relative rotation between the drive gear and the drag plate. That is, the present drag device is capable of reliably holding the sound generating member during the drag operation.

The drag device for a dual-bearing reel according to another aspect of the present invention preferably further comprises a biasing member that biases the sound generating member toward the sound generating plate. In this embodiment, the biasing member is disposed in the holding portion. According to such a configuration, it is possible to reliably cause the sound generating member to interfere with the sound generating plate by the biasing member, at the time of a relative rotation between the drive gear and the drag plate.

In the drag device for a dual-bearing reel according to another aspect of the present invention, the holding portion preferably comprises a hole. In this embodiment, the shaft portion of the sound generating member is disposed in the hole of the holding portion. The biasing member is disposed between the shaft portion of the sound generating member and the hole of the holding portion. According to such a configuration, it is possible to generate a crisp, clear sound, without specially forming a space for disposing a biasing member in the axial direction.

According to the present invention, the drag device for a dual-bearing reel is capable of reliably holding the sound generating member during a drag operation.

BRIEF DESCRIPTION OF THE DRAWINGS

Referring now to the attached drawings which form a part of this original disclosure.

DETAILED DESCRIPTION OF THE EMBODIMENTS

Figure 1:
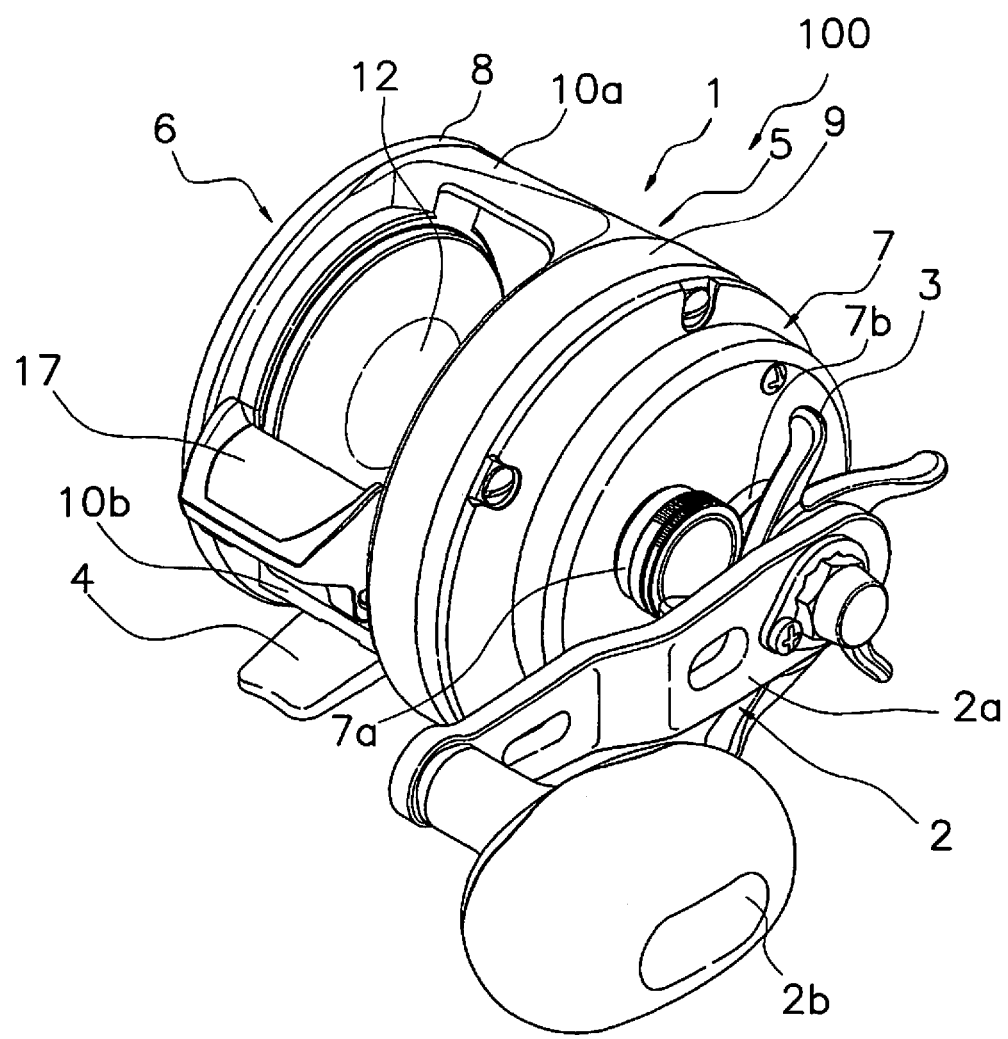
FIG. 1 is a perspective view of a dual bearing reel employing a first embodiment of the present invention.
Figure 2:
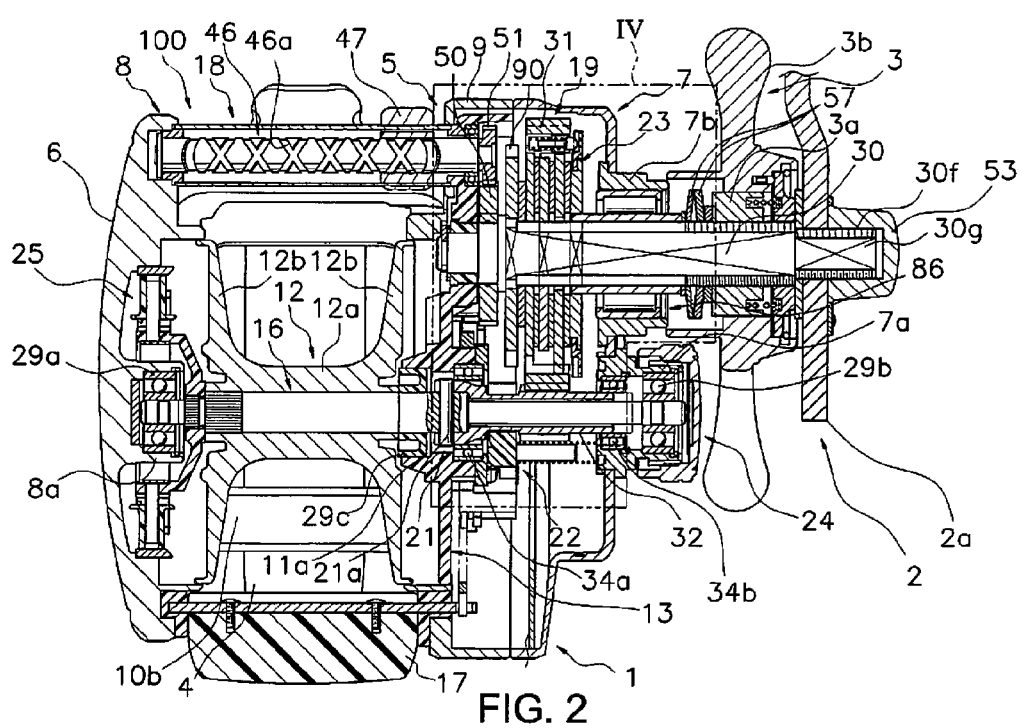
FIG. 2 is a cross-sectional view of the dual bearing reel.

In FIG. 1 and FIG. 2, the dual bearing reel 100 that employs one embodiment of the present invention comprises a reel body 1, a handle 2 for rotating the spool disposed on the reel body 1 side, a spool 12, and a drag device 23.

Schematic Structure of the Dual-Bearing Reel

The reel body 1 comprises a frame 5, a first side cover 6 and a second side cover 7 that are mounted on both (opposite) sides of the frame 5, and a mechanism mounting plate 13. The frame 5 comprises a first side plate 8 and a second side plate 9 that are disposed so as to face each other with a prescribed gap therebetween, and an upper connecting portion 10a and a lower connecting portion 10b that couple the first side plate 8 and second side plate 9. A rod mounting leg portion 4 for mounting a fishing rod is integrally formed on the lower connecting portion 10b.

The first side cover 6 is substantially circular when seen from the axially outer side of the spool, and the second side cover is formed from two eccentric outer circumferential portions whose outer diameters are different. As shown in FIG. 2, the first side cover 6 is integrally formed with the first side plate 8. The second side cover 7 is, for example, fixed to the second side plate 9 by three screws.

The second side cover 7 comprises a first boss portion 7a for supporting a spool shaft 16 discussed below, and a second boss portion 7b for supporting a drive shaft 30 discussed below. The first boss portion 7a is disposed above and behind the second boss portion 7b. The mechanism mounting plate 13 supports the drive shaft 30 to which the handle 2 is integrally and rotatably coupled and the spool shaft 16. The mechanism mounting plate 13 is detachably mounted to the second side cover 7.

As shown in FIG. 1, the handle 2 comprises a handle arm 2a that is integrally and rotatably mounted to the drive shaft 30 (refer to FIG. 2), and a handle grip 2b that is rotatably mounted to the distal end of the handle arm 2a. The handle arm 2a is disposed axially outside of a star drag 3 described later.

As shown in FIG. 2, the spool 12, a clutch lever 17 configured to be operated by being pressed by a thumb, and a level winding mechanism 18 for uniformly winding the fishing line on the spool 12, are disposed on the frame 5. A rotation transmission mechanism 19, a clutch mechanism 21, a clutch control mechanism 22, the drag device 23, and a casting control mechanism 24 are disposed between the frame 5 and the second side cover 7. Further, a centrifugal brake mechanism 25 for suppressing backlash when casting is disposed between the frame 5 and the first side cover 6.

The rotation transmission mechanism 19 transmits the torque from the handle 2 to the spool 12 and the level winding mechanism 18. The clutch mechanism 21 is disposed in the middle of the rotation transmission mechanism 19, and connects and disconnects the drive shaft 30 and the spool 12. The clutch control mechanism 22 controls the connecting and the disconnecting of the clutch mechanism 21 in response to the operation of the clutch lever 17. The casting control mechanism 24 adjusts the resistive force during the rotation of the spool 12.

The spool 12 is integrally and rotatably coupled to the spool shaft 16 that extends through the center thereof. The spool 12 comprises a line-winding drum 12a around which the fishing line is wound, and a pair of large diameter flange portions 12b that are integrally formed on both sides of the line-winding drum 12a. The spool shaft 16 is rotatably supported on the reel body 1 by three axle bearings 29a, 29b, and 29c.

The clutch lever 17 is disposed between the first side plate 8 and the second side plate 9 behind the spool 12. The clutch lever 17 slides in the vertical direction between the first side plate 8 and the second side plate 9.

The level winding mechanism 18 is disposed between the first side plate 8 and the second side plate 9 in front of the spool 12. The level winding mechanism 18 comprises a screw shaft 46 in which a spiral groove 46a in the outer perimeter surface is formed, and a fishing line guide portion 47 that is reciprocated in the spool shaft direction by the screw shaft. The two ends of the screw shaft 46 are rotatably supported by the first side plate 8 and the second side plate 9.

Configuration of the Rotation Transmission Mechanism

The rotation transmission mechanism 19 comprises, as shown in FIG. 2, the drive shaft 30, a drive gear 31 that is fixed to the drive shaft 30, a tubular pinion gear 32 that meshes with the drive gear 31, a first gear member 50 that is integrally and rotatably mounted to the proximal end portion of the drive shaft 30, and a second gear member 51 that is non-rotatably mounted to the right end of the screw shaft 46 in FIG. 2.

Figure 4:
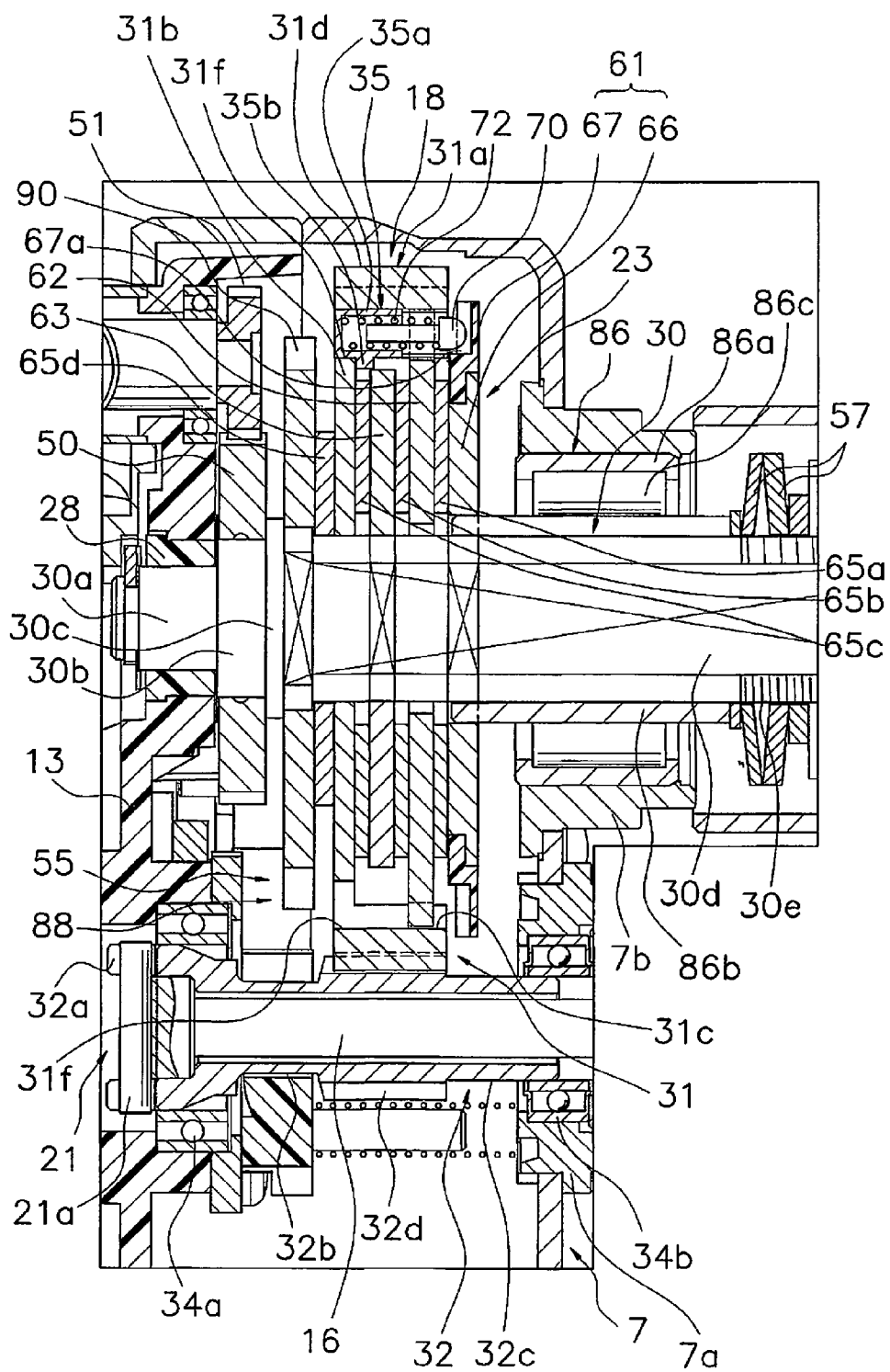
FIG. 4 is an enlarged sectional view of the part IV in FIG. 2.

As shown in FIG. 4, the drive shaft 30 is prevented from rotating (reverse rotation) in the casting direction by a reverse rotation prevention mechanism 55. With this structure, the drag device 23 becomes operable. The reverse rotation prevention mechanism 55 comprises a roller-type first one-way clutch 86 and a claw-type second one-way clutch 88. The first one-way clutch 86 is disposed in the intermediate portion of the drive shaft 30, and is mounted to the second side cover 7 of the reel body 1 between the second boss portion 7b and the drive shaft 30. The first one-way clutch 86 is an inner ring idling-type roller clutch.

Figure 3:
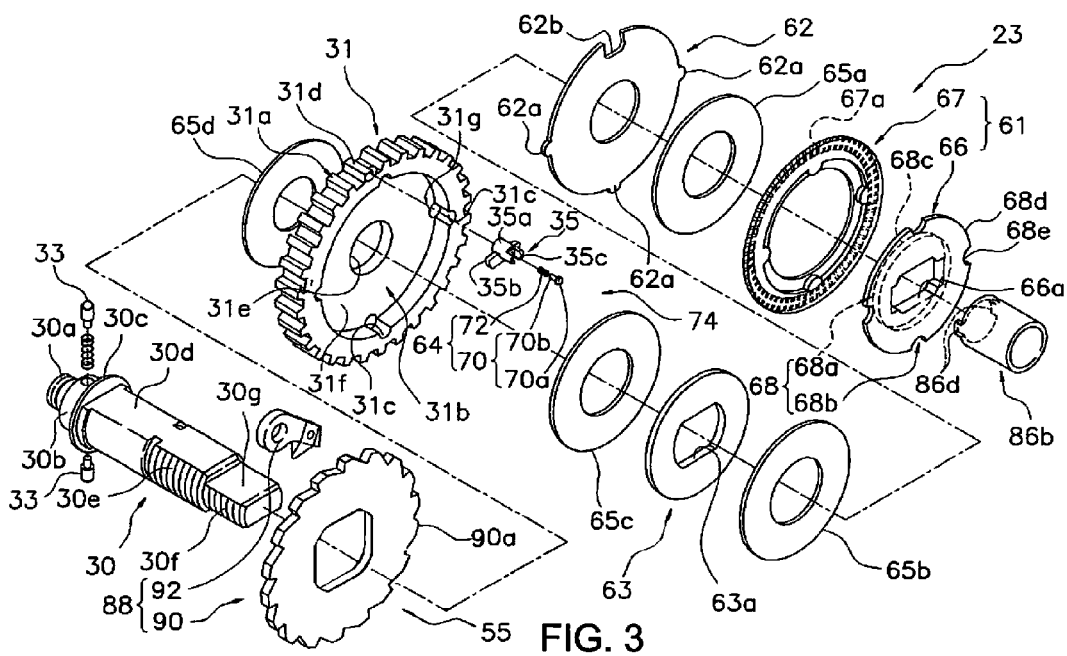
FIG. 3 is an exploded perspective view of the drag device.

The first one-way clutch 86 comprises an outer ring 86a that is non-rotatably mounted to the second boss portion 7b, an inner ring 86b that is integrally and rotatably coupled with the drive shaft 30, and a roller 86c that is disposed between the outer ring 86a and the inner ring 86b. A pair of engagement projections 86d are disposed on the inner ring 86b, as shown in FIG. 3. The pair of engagement projections 86d are formed axially protruding from the end surface of the inner ring 86b on the drive gear 31 side. The pair of engagement projections 86d are integrally and rotatably coupled with the drag plate 66 of a first drag plate 61, to be described later. In this embodiment, the inner ring 86b is integrally and rotatably coupled with the drive shaft 30, via the drag plate 66.

The second one-way clutch 88 comprises, as shown in FIG. 3, a ratchet wheel 90 that has ratchet teeth 90a on the outer perimeter, and a ratchet pawl 92 that is pivotally mounted to the outer side surface of the mechanism mounting plate 13 of the reel body 1. The ratchet wheel 90 is disposed on a first locking portion 30d of the drive shaft 30 while contacting the flange portion 30c, and is integrally rotatable with the drive shaft 30. Rotation of the drive shaft 30 in the casting direction is prevented by the ratchet pawl 92 catching the ratchet teeth 90a. A drag disc 65d of the drag device 23 is disposed between the ratchet wheel 90 and the drive gear 31. The ratchet wheel 90 also functions as a drag plate that is integrally rotatable with the drive shaft 30.

As shown in FIG. 4, the drive shaft 30 is rotatably supported by the second side cover 7 and the frame 5 by the axle bearing 28 and the first one-way clutch 86. From the proximal end side to the distal end side of the drive shaft, a supported portion 30a, a torque regulating part 30b, a flange portion 30c, a first locking portion 30d, a first male thread portion 30e, a second male thread portion 30f (refer to FIG. 3), and a second locking portion 30g (refer to FIG. 3) are formed on the drive shaft 30, as shown in FIG. 3 and FIG. 4.

An axle bearing 28 rotatably supporting the drive shaft 30 (refer to FIG. 4) is mounted on the supported portion 30a. The torque regulating portion 30b is larger in diameter than the supported portion 30a. The torque regulating portion 30b integrally and rotatably couples the first ear member 50 to the drive shaft 30 within the allowable torque with a pair of regulating pins 33 that are biased radially outward. The flange portion 30c is larger in diameter than the torque regulating portion 30b. The flange portion 30c can receive the pressing force that is generated by the drag device 23. The first locking portion 30d is configured to integrally and rotatably couple a first drag plate 61, a third drag plate 63, and a ratchet wheel 90 that configure the drag device 23 (each mentioned below) to the drive shaft 30.

The first locking portion 30d is smaller in diameter than the flange portion 30c, and is formed with two sets of chamfered portions that are parallel to each other. The star drag 3 of the drag device 23 screws onto the first male threaded portion 30e. The first male threaded portion 30e is formed on the outer perimeter surface of the distal end of the first locking portion 30d (outer perimeter surface excluding the first locking portion 30d). The second male threaded portion 30f is formed on the distal end portion of the drive shaft 30 so as to have a smaller diameter than the first male threaded portion 30e.

The second locking portion 30g is smaller in diameter than the first locking portion 30d, and is formed with a set of chamfering portions that are parallel to each other. The second locking portion 30g is formed on the outer perimeter surface of the drive shaft 30 where the second male threaded portion 30f is formed. The second locking portion 30g integrally and rotatably couples to the handle 2. That is, the handle 2 is integrally and rotatably fixed to the drive shaft 30 by a nut 53 (refer to FIG. 2) that is screwed onto the second male threaded portion 30f.

As shown in FIG. 3 and FIG. 4, the drive gear 31 is rotatably mounted to the drive shaft 30, and is coupled to the drive shaft 30 via the drag device 23. The drive gear 31 comprises a tubular gear part 31a, a disc part 31b that has a thinner wall than the gear part 31a, and at least one first engagement recess 31c that is formed on the inner perimeter surface of the gear part 31a.

The gear part 31a comprises gear teeth 31d that are formed on the outer perimeter side of the drive gear 31. The disc part 31b is integrally formed on the inner perimeter side of the gear part 31a and is rotatably mounted to the drive shaft 30. The disc part 31b is thinner walled than the gear part 31a. A support hole 31e that is supported on the drive shaft 30 is formed in the center of the disc part 31b.

Further, the disc part 31b comprises a pressed side surface 31f that is pressed by the drag device 23 on the handle 2 side, and a circular mounting hole 31g that extends in the axial direction. A housing member 35 (described later) in which the striking pin 70 is housed, is disposed to the mounting hole 31g.

The first engagement recess 31c integrally and rotatably couples the second drag plate 62 to the drive gear 31. Further, the first engagement recess 31c has a portion of the housing member 35 disposed therein. Here, a plurality (for example two to six, four in this embodiment) of first engagement recesses 31e are formed recessed in a circular arcuate shape in the inner perimeter part of the gear part 31a. Further, the first engagement recess 31c extends in the axial direction and is connected to the inner perimeter surface of the mounting hole 31g (refer to FIG. 8).

As shown in FIG. 2, the pinion gear 32 is a tubular member that extends from outside of the second side plate 9 inwardly, and through the center of which extends the spool shaft 16. The pinion gear 32 is rotatably supported on the reel body 1 so as to be movable in the axial direction by the axle bearing 34a and axle bearing 34b. The axle bearing 34a is mounted to the mechanism mounting plate 13. The axle bearing 34b is mounted to the first boss portion 7a of the second side cover 7.

As shown in FIG. 4, in the left end portion of the pinion gear 32 a meshing groove 32a is formed that meshes with an engagement pin 21a of the clutch mechanism 21, to be described later. The clutch mechanism 21 is formed from the meshing groove 32a and the engagement pin 21a that is mounted on the spool shaft 16. Further, a constricted portion 32b is formed in the middle portion, and a support portion 32c that is supported by the axle bearing 34b is formed in the right end portion of the pinion gear 32, as shown in FIG. 4. A gear part 32d that meshes with the drive gear 31 is formed between the constricted portion 32b and the support portion 32c.

The first gear member 50 is, as described above, mounted on the torque regulating portion 30b of the drive shaft 30. The first gear member 50 runs idle when the screw shaft 46 or the second gear member 51 becomes, for some reason, non-rotatable and torque exceeding the allowable torque acts on the first gear member 50. The first gear member 50 abuts the flange portion 30c from the proximal end portion side of the drive shaft 30. The second gear member 51 that is mounted to the screw shaft 46 meshes with the first gear member 50. With this configuration, the screw shaft 46 of the level winding mechanism 18 rotates in conjunction with the rotation of the drive shaft 30 in the line winding direction.

Configuration of the Drag Device

The drag device 23 regulates the relative rotation between the drive gear 31 interlocked with the spool 12 and the drive shaft 30 until a prescribed torque amount is exceeded. Further, the drag device 23 brakes the rotation of the spool 12 in the casting direction when the relative rotation of the drive gear 31 and the drive shaft 30 exceeds the prescribed torque amount.

As shown in FIG. 2 to FIG. 4, the drag device 23 mainly comprises a star drag 3 (one example of a drag adjustment member), a first drag plate 61 (one example of a drag plate), a second drag plate 62, a third drag plate 63, a striking pin 70 (one example of a sound generating member), a biasing member 72, a plurality (for example four) of drag disks 65a-65d, and a housing member 35.

Star Drag

As shown in FIG. 2, the star drag 3 comprises a nut member 3a that is threaded onto the first male threaded portion 30e of the drive shaft 30, and a main body member 3b that integrally and rotatably supports the nut member 3a, as well as removably in the axial direction. The star drag 3 is a member for pressing a member mounted to the drive shaft 30 further to the proximal end side than the star drag 3 (for example, members such as the inner ring 86b of the first one-way clutch 86, the first drag plate 61, the second drag plate 62, or the third drag plate 63) to adjust the prescribed torque amount.

A plurality (for example two to six, two in this embodiment) of disc springs 57 are mounted between the star drag 3 and the first one-way clutch 86. The disc springs 57 gently transmit the clamping force of the star drag 3 to the first drag plate 61. The disc springs 57 contact the star drag 3 and the inner ring 86b of the first one-way clutch 86, each via a washer.

By adjusting the tightness thereof, the star drag 3 can move the inner ring 86b of the first one-way clutch 86 that is mounted to the second side cover 7 in the axial direction via the disc spring 57. That is, the pressing force of the disc springs 57 is adjusted by adjusting the star drag 3. It is possible to adjust the pressing force of the disc springs 57 by the tightness of the star drag 3, to change the degree of pressing of the drive gear 31. Accordingly, the magnitude of the torque for rotating the spool 12, i.e., the drag force, is adjusted.

First Drag Plate

As shown in FIG. 3 and FIG. 4, the first drag plate 61 is integrally and rotatably mounted to the drive shaft 30. The first drag plate 61 is configured to be capable of being pressed by the star drag 3. The first drag plate 61 is pressed toward, the drive gear 31 by the star drag 3. Specifically, the first drag plate 61 is pressed, toward the drive gear 31 by the star drag 3 via the disc springs 57 and the inner ring 86b of the first one-way clutch 86.

The first drag plate 61 comprises a drag plate 66 and a sound generating ring 67. The drag plate 66 is integrally and rotatably mounted on the first locking portion 30d of the drive shaft 30, and is capable of pressing the drive gear 31.

Figure 5:
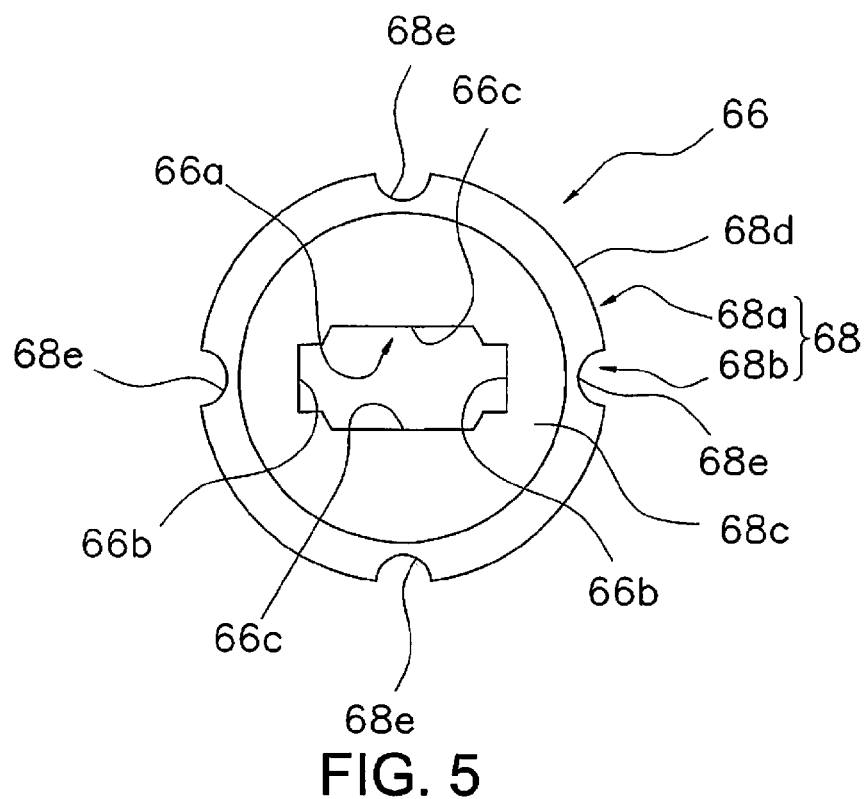
FIG. 5 is a front elevational view of a first drag plate seen from the drive gear side.
Figure 6:
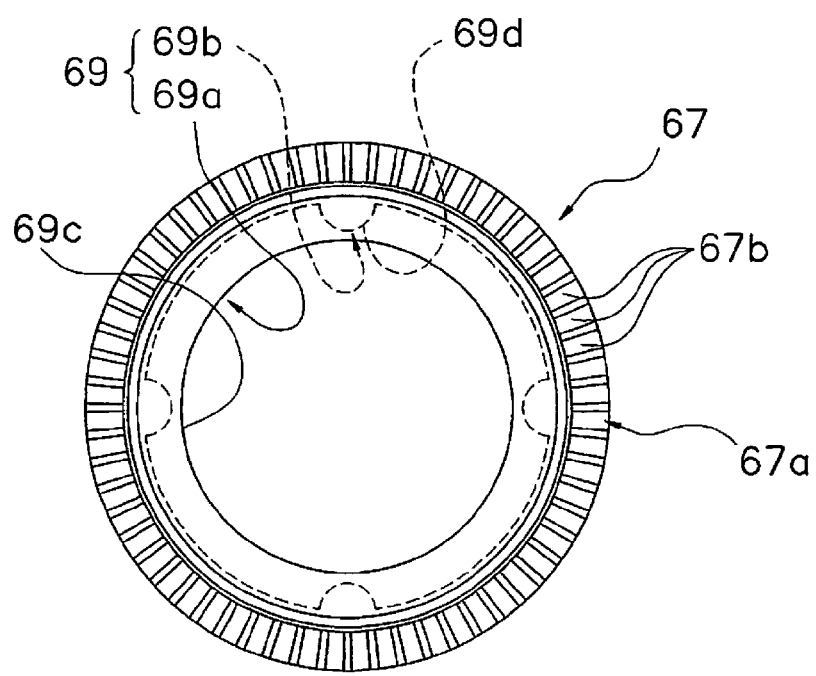
FIG. 6 is a front elevational view of a second drag plate seen from the drive gear side.

As shown in FIG. 3 and FIG. 5, the drag plate 66 is a disc-shaped member. The drag plate 66 comprises an engagement portion 68 that is formed on the outer perimeter and that engages the sound generating ring 67, and a non-circular hole 66a is formed in the inner perimeter. The non-circular hole 66a is integrally and rotatably engaged with the first locking portion 30d of the drive shaft 30, as well as with the pair of engagement projections 86d of the inner ring 86b of the first one-way clutch 86. The non-circular hole 66a comprises a pair of rectangular recesses 66b that engage the pair of engagement projections 86d of the inner sing 86b, and a pair of straight portions 66c that engage the first locking portion 30d of the drive shaft 30.

The engagement portion 68 comprises a first engagement portion 68a that engages the sound generating ring 67 in the pressing direction in which the drive gear 31 is pressed (the left direction of the drive shaft in FIG. 3) and a second engagement portion 68b that engages the sound generating ring 67 in the circumferential direction. The first engagement portion 68a comprises a pressing portion 68c that protrudes in the pressing direction, and a flange portion 68d that extends radially from the outer perimeter of the pressing portion 68c. The second engagement portion 68b comprises at least one second engagement recess 68e that is disposed at an interval in the circumferential direction of the flange portion 68d of the engagement portion 68.

The sound generating ring 67 is mounted to the outer perimeter of the drag plate 66 so as to be integrally rotatable with the drag plate 66. The sound generating ring 67 is formed on a pressure side surface with respect to the drive gear 31.

The sound generating ring 67 is a synthetic resin member made of, for example, polyamide resin, polyphenylene sulfide resin, etc., that has been reinforced by a filler, such as glass fiber or carbon fiber. In this embodiment, polyphenylene sulfide resin was chosen.

Figure 7:
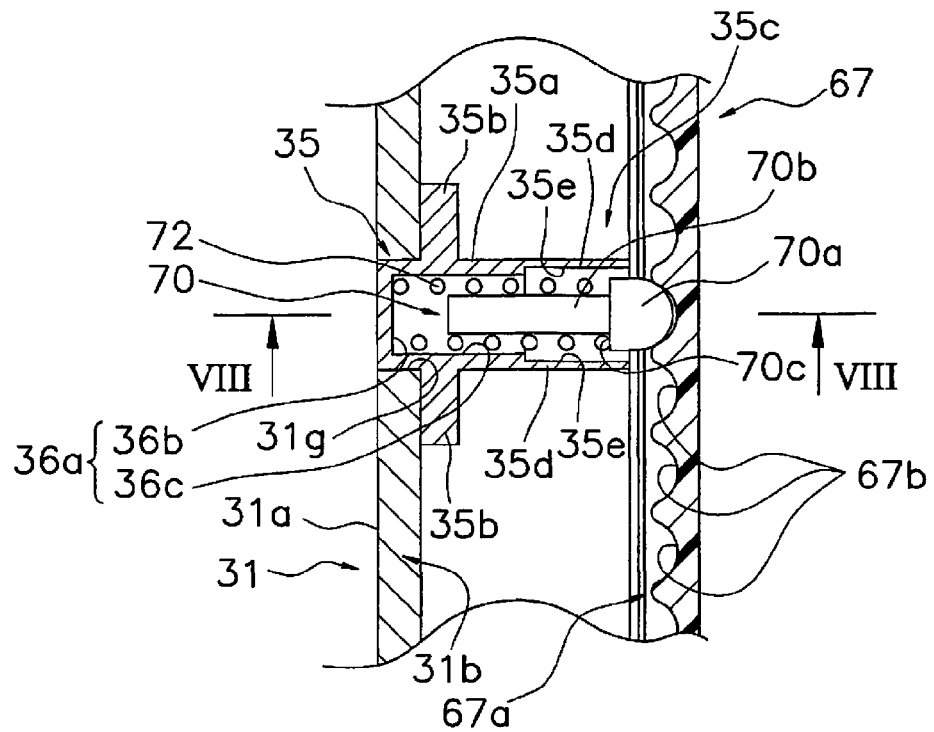
FIG. 7 is a cross-sectional view of the drive gear and the striking pin mounting portion of the sound generating ring.

As shown in FIG. 3, FIG. 6, FIG. 7, and FIG. 8, the sound generating ring 67 comprises an engaged portion 69 that engages the engagement portion 68 of the drag plate 66, and a sound generating plate 67a on a surface that can oppose the drive gear 31. The sound generating plate 67a comprises a plurality of sound generating recesses 67b that are formed at intervals in the circumferential direction. In this embodiment, the sound generating recesses 67b are formed at equal intervals, recessed in a wave shape, as shown in FIG. 7.

A prescribed gap is disposed between the engaged portion 69 and the engagement portion 68. The engaged portion 69 comprises a first engaged portion 69a that engages the first engagement portion 68a, and a second engaged portion 69b that engages the second engagement portion 68b. The first engaged portion 69a comprises a through-hole 69c into which the pressing portion 68c can be inserted and that is smaller in diameter than the flange portion 68d. The second engaged portion 69b comprises a second engagement protrusion 69d that engages the second engagement recess 68e of the drag plate 66.

Figure 8:
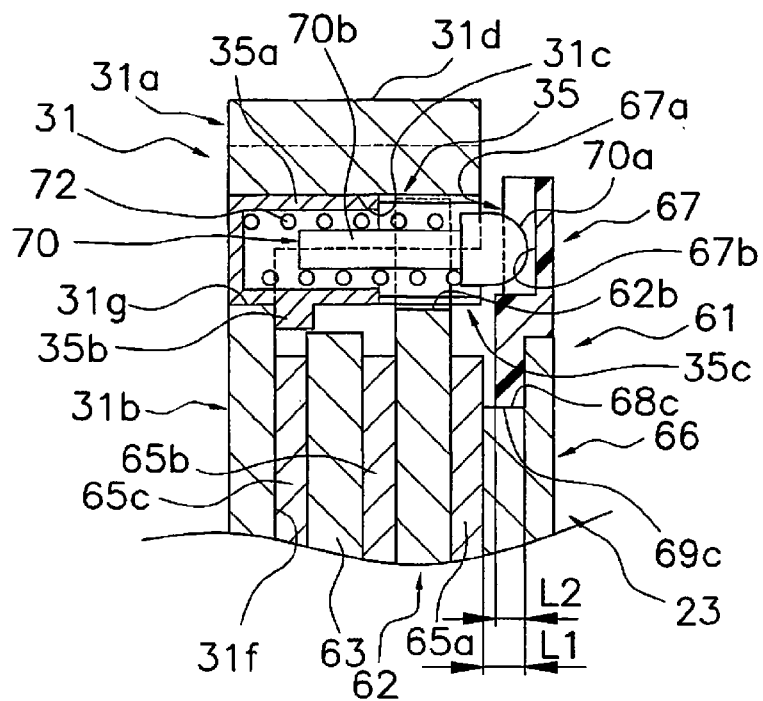
FIG. 8 is a cross-sectional view taken along line VIII-VIII of FIG. 7.

As shown in FIG. 8, the length L1 of the pressing portion 68c in the pressing direction is longer than the length L2 of the through-hole 69c in the pressing direction. In particular, the length L1 of the pressing portion 68c is at least 0.1 longer than the length L2 of the through-hole 69c. Meanwhile, in FIG. 8, the length L2 of the through-hole 69e is drawn shorter than the actual length in order to mate the gap easily recognizable. The sound generating ring 67 is thereby movable in the axial direction with respect to the drag plate 66 by an amount corresponding to the gap between the two, which is the difference between the lengths L1 and L2.

Figure 9:
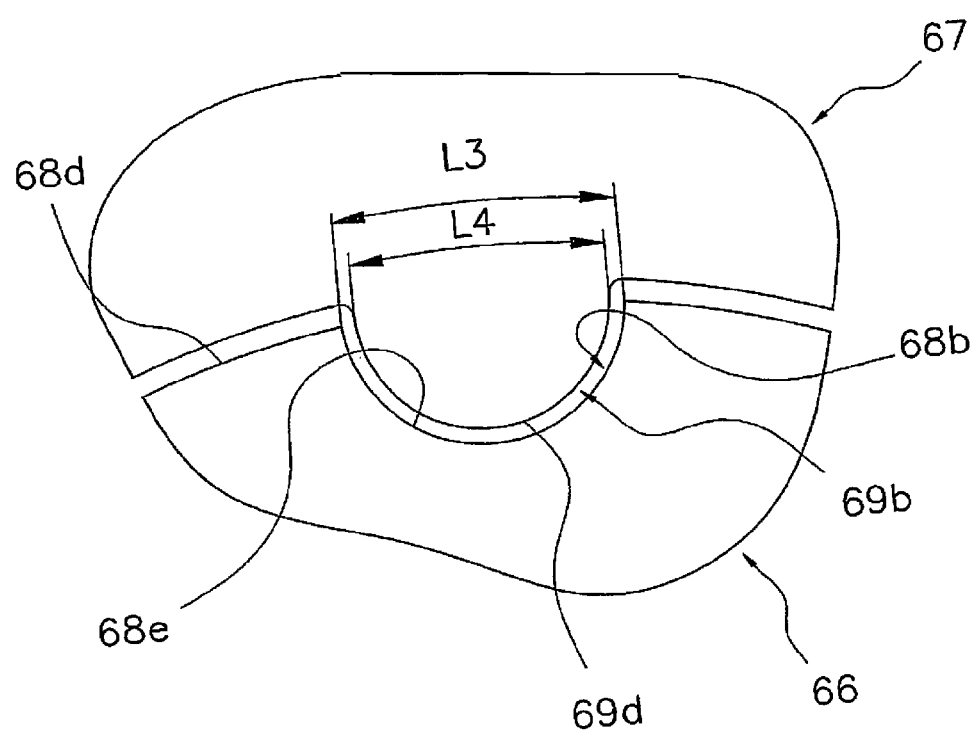
FIG. 9 is a schematic diagram showing the length of a first engagement recess of the drag plate in the circumferential direction and the length of the first engagement protrusion of the sound generating ring in the circumferential direction.

As shown in FIG. 9, the length L4 of the sound generating ring 67 in the circumferential direction of the second engagement protrusion 69d is shorter than the length L3 of the drag plate 66 in the circumferential direction of the second engagement recess 68e. Specifically, the length L4 of the second engagement protrusion 69d in the circumferential direction is at least 0.1 mm shorter than the length L3 of the second engagement recess 68e in the circumferential direction. Meanwhile, in FIG. 9, the length L4 of the second engagement protrusion 69d is drawn shorter than the actual length in order to make the gap easily recognizable. The sound generating ring 67 is thereby movable in the circumferential direction with respect to the drag plate 66 by an amount corresponding to the gap between the two in the circumferential direction, which is the difference between the lengths L3 and L4.

Second Drag Plate

As shown in FIG. 3 and FIG. 4, the second drag plate 62 is disposed between the first drag plate 61 and the third drag plate 63. The second drag plate 62 is disposed on the inner perimeter of the gear part 31a of the drive gear 31, and is integrally and rotatably disposed within the drive gear 31. The second drag plate 62 is pressed by the pressing portion 68c of the drag plate 66 of the first drag plate 61 via the drag disc 65a. The second drag plate 62 comprises at least one first engagement protrusion 62a on the outer perimeter that engages the plurality of first engagement recesses 31c of the drive gear 31. The first engagement protrusions 62a are preferably smaller in number than the first engagement recesses 31c. In this embodiment, the number of the first engagement recesses 31c is four and the number of the first engagement protrusions 62a is three.

Further, the second drag plate 62 comprises a passage recess 62b through which the spiking pin 70 can pass. The passage recess 62b is disposed in the outer perimeter of the second drag plate 62. Specifically, in a state where the first engagement protrusions 62a are engaged with the first engagement recesses 31c, the passage recess 62b is disposed in the outer perimeter of the second drag plate 62, in a position opposing the remaining first engagement recess 31c. For example, in a case where the first engagement recesses 31c are disposed at equal intervals, a plurality of first engagement protrusions 62a and passage recesses 62b are disposed at equal intervals. The passage recess 62b is formed so that the striking pin 70 housed in the housing member 35 can pass therethrough. In particular, the passage recess 62b is formed so that the housing member 35 and the striking pin 70 can pass therethrough.

Third Drag Plate

The third drag plate 63 is disposed between the second drag plate 62 and the drive gear 31. The third drag plate 63 is pressed by the second drag plate 62 via a drag disk 65b. The third drag plate 63 is disposed on the inner perimeter of the gear part 31a of the drive gear 31, and comprises a non-circular hole 63a that is integrally and rotatably engaged with the first locking portion 30d of the drive shaft 30 on the inner perimeter, via the drag disc 65. The third drag plate 63 presses the disc part 31b of the drive gear 31 via the drag disc 65c.

Striking Pin

The striking pin 70 is disposed in the housing member 35. Specifically, the striking pin 70 is mounted in the housing member 35 so as to be freely movable back and forth with respect to the sound generating plate 67a of the first drag plate 61.

The striking pin 70 is a metallic member and can repeatedly impact the sound generating plate 67a. For example, the striking pin 70 generates a sound by an interference between the sound generating plate 67a and the head portion 70a at the time of a relative rotation between the drive gear 31 and the first drag plate 61.

The striking pin 70 comprises a head portion 70a that can come in contact with the sound generating plate 67a, and a shaft portion 70b that is connected to the head portion 70a.

The head portion 70a is disposed on the distal end and has a large diameter. The head portion 70a is formed in a bullet shape, and the distal end portion is, for example, rounded to be spherical. The head portion 70a has a size with which it is possible to engage the sound generating recesses 67b. Specifically, it is a size that can enter into the sound generating recesses 67b. The head portion 70a is disposed so as to protrude from a housing main body 35a (to be described later) of the housing member 35. The shall portion 70b is integrally formed with the proximal end of the head portion 70a. The shaft portion 70b is disposed in the housing member 35, for example, the housing main body 35a. The shaft portion 70b is smaller in diameter than the head portion 70a, and engages the biasing member 72.

Biasing Member

The biasing member 72 biases the striking pin 70. The biasing member 72 is disposed in the housing member 35. Specifically, the biasing member 72 is a coil spring that is disposed on the outer perimeter of the shaft portion 70b of the striking pin 70. The biasing member 72 is disposed in a compressed state between the bottom surface 36c of the housing member 35 (to be described later), and the head portion 70a and the step 70c of the shaft portion 70b of the striking pin 70. The biasing member 72 thereby elastically biases the striking pin toward the sound generating plate 67a.

A sounding mechanism is formed of the striking pin 70, the biasing member 72, and the sound generating plate 67a. The striking pin 70 that is biased toward the sound generating plate 67a by the biasing member 72 biases the first drag plate 61 to the handle 2 side in an assembled state.

Drag Disk

As shown in FIG. 4, the drag disk 65a is disposed between the first drag plate 61 and the second drag plate 62. The drag disk 65b is disposed between the second drag plate 62 and the third drag plate 63. The drag disk 65c is disposed between the third drag plate 63 and the drive gear 31 (disc portion 31b). The drag disk 65d is disposed between the drive gear 31 (disc portion 31b) and the ratchet wheel 90. The drag disc 65a to drag disc 65d are, for example, formed of members such as felt, carbon, etc.

Housing Member

As shown in FIG. 3, FIG. 4, FIG. 7, and FIG. 8, the housing member 35 is mounted to the drive gear 31. Specifically, the housing member 35 is mounted to the disc portion 31b of the drive gear 31. More specifically, the housing member 35 is mounted in a mounting hole 31g of the disc portion 31b in the drive gear 31, for example to any one of the tour mounting holes 31g.

Specifically, as shown in FIG. 7 and FIG. 8, the housing member 35 comprises a housing main body 35a (one example of a holding portion), a positioning portion 35b, and a regulating portion 35c.

The housing main body 35a holds the shaft portion 70b of the sinking pin 70. That is, the shaft portion 70b of the sinking pin 70 is housed in the housing main body 35a. The housing main body 35a is formed in a bottomed cylindrical shape. As shown in FIG. 7 and FIG. 8, the housing main body 35a can be engaged with the mounting hole 31g and the first engagement recess 31c. Specifically, the bottom side of the housing main body 35a is fitted to the mounting hole 31g, and the opening portion side of the housing main body 35a is partially engaged with the first engagement recess 31c.

As shown in FIG. 7, the housing main body 35a includes a hole 36a. The shaft portion 70b of the striking pin 70 is disposed in the hole 36a. Further, the biasing member 72 is disposed in the hole 36a. Specifically, the hole 36a comprises a bottom surface 36b and an inner perimeter surface 36c. The biasing member 72 is disposed between the inner perimeter surface 36c and the shaft portion 70b. Further, the two ends of the biasing member 72 are each separately brought to contact with the bottom surface 36b, and with the head portion 70a of the striking pin 70 as well as the step 70c of the shaft portion 70b.

As shown in FIG. 3, FIG. 7, and FIG. 8, the positioning portion 35b is for positioning the housing main body 35a in the axial direction and the radial direction. The positioning portion 35b is integrally formed with the housing main body 35a. The positioning portion 35b protrudes outwardly from the outer perimeter surface of the housing main body 35a. Specifically, the positioning portion 35b protrudes from the outer perimeter surface of the housing main body 35a toward the circumferential direction (refer to FIG. 7) as well as radially inwardly (drive shaft 30; refer to FIG. 8).

Here, in a state in which the housing main body 35a is mounted to the mounting hole 31g and to the first engagement recess 31c, the surface of the positioning portion 35b in the axial direction (surface away from the handle 2) comes into contact with the wall surface of the disc portion 31b in the periphery of the mounting hole 31g. Then, the surface on the radially outer side of the positioning portion 35b comes into contact with the inner perimeter surface of the gear part 31a. The positioning and the detent of the housing main body 35a in the axial direction are thereby carried out.

The regulating portion 35c regulates the movement of the head portion 70a of the stoking pin 70. The regulating portion 35c is configured to be capable of regulating the movement of the head portion 70a of the striking pin 70 in the circumferential direction. As shown in FIG. 7, the regulating portion 35c is integrally formed with the housing main body 35a. As shown in FIG. 8, the regulating portion 35c can be engaged with the first engagement recess 31c. Specifically, the regulating portion 35c is partially engaged with the first engagement recess 31c.

Specifically, as shown in FIG. 7, the regulating portion 35c comprises a pair of protrusions 35d. Each of the pair of protrusions 35d protrudes from the housing main body 35a in the axial direction so as to face each other in the circumferential direction. Specifically, each of the pair of protrusions 35d protrudes from the outer perimeter part and the positioning portion 35b of the housing main body 35a in the axial direction, so as to face each other in the circumferential direction.

Each of the pair of protrusions 35d comprises opposing surfaces 35e that face each other in the circumferential direction. The head portion 70a of the sinking pin 70 is disposed between the opposing surfaces 35e. The opposing surfaces 35e oppose the head portion 70a of the striking pin 70 in the circumferential direction. Specifically, the proximal end (shaft portion side portion) of the head portion 70a of the striking pin 70 opposes the opposing surfaces 35e in the circumferential direction. The opposing surfaces 35e are formed in a substantially circular arcuate shape, when viewed from the sound generating plate 67a (viewed in the axial direction). Specifically, the opposing surfaces 35e are formed such that the curvature of the opposing surfaces 35e are substantially the same as the curvature of the outermost shape of the striking pin, when viewed from the sound generating plate 67a.

A prescribed gap is disposed between the opposing surfaces 35e and the head portion 70a of the striking pin 70. The head portion 70a of the striking pin 70 is capable of moving in circumferential direction within the range of this gap. In other words, when the head portion 70a of the striking pin 70 abuts either one of the pair of opposing surfaces 35e, the movement of the head portion 70a of the striking pin 70, that is, the movement of the head portion 70a in the circumferential direction, is regulated by this abutment.

In this type of configuration, the striking pin rotates in conjunction with the drive gear 31, and the drive shaft 30 and the first drag plate 61 are prevented from reverse rotation by a reverse rotation prevention mechanism 55. Therefore, when the drive shaft 30 and the drive gear 31 rotate relatively with the operation of the drag device 23, the striking pin 70 repeatedly impacts on the sound generating plate 67a of the first drag plate 61 and emits a sound.

Operation of the Dual-Bearing Reel

Next, the operation of this dual bearing reel will be explained.

When winding the fishing line, the handle 2 is turned in the line winding direction. The rotation of the handle 2 is transmitted from the drive shaft 30 to the drive gear 31 that is interlocked with the drive shaft 30 and the pinion gear 32 via the drag device 23. The rotation of the pinion gear 32 is transmitted to the spool shaft 16 that is fitted with the pinion gear 32 by the clutch mechanism 21, and the spool 12 rotates and winds the fishing line. This rotation of the drive shaft 30 is also transmitted to the screw shall 46 via the first gear member 50 and the second gear member 51. With the rotation of the screw shaft 46, the fishing line guiding part 47 of the level winding mechanism 18 reciprocates along the spool shaft 16. With this reciprocating motion, the fishing line is substantially uniformly wound to the spool 12.

On the other hand, where unreeling the fishing line, the clutch lever 17 is operated and the clutch mechanism 21 is put in a detaching state (a clutch-off state) by the clutch control mechanism 22. The engagement between the spool shaft 16 and the pinion gear 32 is thereby released, and even if the spool 12 is rotated due to the unreeling of the fishing line, the rotation is not transmitted to the rotation transmission mechanism 19 or the drive shaft 30.

Operation of the Drag Device

Next, the operation of the drag device 23 will be explained.

When catching a fish, tension is applied to the fishing line. With this tension, torque that tries to rotate the spool in the casting direction acts on the spool 12. However, since the drive gear 31 is pressed to the ratchet wheel 90 side by the disc spring 57 that is compressed by the tightening of the star drag 3, as long as the torque that acts on the spool 12 is small, the drive gear 31 and the drive shaft 30 are relatively non-rotatable. And, since the drive shaft 30 is stopped by the reverse rotation prevention mechanism 55 so as to not rotate in the casting direction, the spool 12 that is interlocked with the drive gear 31 will also not rotate in the casting direction.

When the tension on the fishing line increases and the torque applied to the spool 12 becomes large, the drive gear 31 and the second drag plate 62 will be rotated in the casting direction while slipping with respect to the first drag plate 61, the third drag plate 63, and the ratchet wheel 90. The spool 12 will thereby also rotate in the casting direction. In this manner, when the torque that acts on the spool 12 exceeds a prescribed value and excessive tensile force is applied to the fishing line, the drag device 23 is activated and the spool 12 is rotated in the casting direction to protect the fishing line front excessive tensile force.

When the spool 12 is rotated in the casting direction when catching a fish, as described above, a sound is generated by the sounding mechanism. When the drive shaft 30 and the drive gear 31 are relatively rotated, the sound generating recess 67b of the first drag plate 61 that rotates in conjunction with the drive shaft 30 and the striking pin 70 that rotates in conjunction with the drive gear 31 will interfere with each other and generate a clicking sound. The clicking sound is generated by the head portion 70a of the striking pin 70, which is biased toward the sound generating recesses 67b that are disposed at equal intervals, so as to abut intermittently.

SUMMARY

The embodiment described above can be expressed as the following.

The present drag device 23 for a dual-bearing reel regulates the relative rotation between the drive gear 31 and the drive shaft 30. The drag device 23 for the dual bearing reel comprises a first drag plate 61, a striking pin 70, and a housing member 35. The first drag plate 61 is configured to be integrally rotatable with the drive shaft 30, as well as capable of being pressed by the star drag 3. The first drag plate 61 comprises a sound generating plate 67a that opposes the drive gear 31. The striking pin 70 comprises a head portion 70a that comes into contact with the sound generating plate 67a, and a shaft portion 70b that is connected to the head portion 70a. The striking pin 70 generates a sound by an interference between the sound generating plate 67a and the head portion 70a at the time of relative rotation between the drive gear 31 and the first drag plate 61. The housing member 35 is mounted to the drive gear 31. The housing member 35 comprises a housing main body 35a for holding the shaft portion 70b of the striking pin 70, and a regulating portion 35c that regulates the movement of the head portion 70a.

In the present drag device 23, the housing main body 35a of the housing member 35 holds the shaft portion 70b of the striking pin 70. Further, the regulating portion 35c of the housing member 35 regulates the movement of the head portion 70a of the striking pin 70. According to such a configuration, the movement of the head portion 70a of the striking pin 70 is regulated by the regulating portion 35c of the housing member 35 at the time of relative rotation between the drive gear 31 and the first drag plate 61, even when the gap between the drive gear 31 and the sound generating plate 67a of the first drag plate 61 is increased. Accordingly, the shaft portion 70b of the striking pin 70 is less likely to fell out of the housing main body 35a of the housing member 35. That is, the present drag device 23 is capable of reliably holding the striking pin 70 during a drag operation.

In the present drag device 23 for a dual-bearing reek the housing main body 35a preferably includes a hole 36a. In this embodiment, the shaft portion 70b of the striking pin 70 is disposed in the hole 36a of the housing main body 35a. According to such a configuration, it is possible to reliably hold the shaft portion 70b of the striking pin 70. That is, the present drag device 23 is capable of reliably holding the sulking pin 70 during a drag operation.

In the present drag device 23 for a dual-bearing reel, the regulating portion 35c is preferably configured to be capable of regulating the movement of the head portion 70a of the striking pin 70 in the circumferential direction. According to such a configuration, it is possible to reliably regulate the movement of the head portion 70a of the striking pin 70 in the circumferential direction by the regulating portion 35c, at the time of a relative rotation between the drive gear 31 and the first drag plate 61. That is, the present drag device 23 is capable of reliably holding the striking pin 70 during a drag operation.

In the present drag device 23 for a dual-bearing reek the regulating portion 35c preferably comprises a pair of opposing surfaces 35e that face each other in the circumferential direction. In this embodiment, the head portion 70a of the striking pin 70 is disposed between the pair of opposing surfaces 35e. According to such a configuration, it is possible to reliably regulate the movement of the head portion 70a of the striking pin 70 in the circumferential direction by the pair of opposing surfaces 35e, at the time of a relative rotation between the drive gear 31 and the first drag plate 61. That is, the present drag device 23 is capable of reliably holding the striking pin 70 during a drag operation.

In the present drag device 23 for a dual-bearing reel, the regulating portion 35c preferably comprises a pair of protrusions 35d. In this embodiment, the pair of protrusions 35d protrude from the housing main body 35a so as to face each other in the circumferential direction. Each of the pair of protrusions 35d comprises opposing surfaces 35e that face each other in the circumferential direction.

According to such a configuration, it is possible to reliably regulate the movement of the head portion 70a of the striking pin 70 in the circumferential direction by the pair of protrusions 35d, i.e., the pair of opposing surfaces 35e, at the time of a relative rotation between the drive gear 31 and the first drag plate 61. That is, the present drag device 23 is capable of reliably holding the striking pin 70 during a drag operation.

The present drag device 23 for a dual-bearing reel preferably further comprises a biasing member 72 that biases the striking pin 70 toward the sound generating plate 67a. In this embodiment, the biasing member 72 is disposed in the housing main body 35a. According to such a configuration, it is possible to reliably cause the striking pin 70 to interfere with the sound generating plate 67a by the biasing member 72, at the time of a relative rotation between the drive gear 31 and the first drag plate 61.

In the present drag device 23 for a dual-bearing reel, the housing main body 35a preferably includes a hole 36a. In this embodiment the shall portion 70b of the striking pin 70 is disposed in the hole 36a of the housing main body 35a. The biasing member 72 is disposed between the shaft portion 70b of the striking pin 70 and the hole 36a of the housing main body 35a. According to such a configuration, it is possible to generate a crisp, clear sound, without specially preparing a space for disposing the biasing member 72 in the axial direction.

Other Embodiments

One embodiment of the present invention was described above, but the present invention is not limited to the above-described embodiment, and various modifications can be made without departing from the scope of the invention. In particular, the various embodiments and modified examples described in the present specification can be freely combined according to necessity.

In the above-described embodiment, a round metallic dual bearing reel is described as an example, but the drag device of the present invention can be employed in all drag devices mounted to a drive shaft of a dual bearing reel.

In the above-described embodiment, an example is shown in which the sound generating plate 67a comprises a plurality of sound generating recesses 67b, but the form of the sound generating plate 67a is not limited thereto For example, a plurality of sound generating protrusions protruding at intervals in the circumferential direction are possible, as long as the configuration is one in which the striking pin 70 will repeat a repealed impact with the relative rotation of the sound generating ring 67 and the drive gear 31. Further, the shapes of the sound generating recesses 67b are not limited to a wave shape, and can be formed, for example, in a spherical, triangular, or rectangular shape.

In the above-described embodiment, the first drag plate 61 is formed by two members, the drag plate 66 that has a pressing portion 68c and a sound generating ring 67 that has a sound generating plate 67a, but the present invention is not limited thereto. A sound generating plate 67a may be disposed on one member of the first drag plate 61.

In the above-described embodiment, a second drag plate 62 and a third drag plate 63 are disposed on the drag device 23 in order to increase the transmitted torque, but it is not necessary to provide these drag plates.

In the above-described embodiment, one striking pin 70 is provided, but a plurality (for example two) of striking pins 70 may be provided as well. In this embodiment, a plurality of housing members 35 should be provided, and the housing member 35 should be mounted in the mounting hole 31g and the striking pins 70 should be housed in this housing member 35. In this embodiment, each striking pin 70 may be made to emit sounds at a different rotational phase. For example, the number of the sound generating recesses of the sound generating ring may be made a number that is not divisible by the number of the striking pins 70. Further, the phases of the first engagement recesses and the mounting hole may be changed to a position in winch a plurality of striking pins 70 will not emit sounds at the same time. The sound emitting cycle of the striking pins 70 will be short. Further, a plurality of striking pins 70 may be made to emit sounds simultaneously to increase the volume. In the above-described embodiment, since the housing member 35 and the drive gear 31 are separate, it is easy to provide a plurality of striking pins 70 as described above.

What is claimed is:

1. A drag device for a dual bearing reel for regulating relative rotation between a drive gear and a drive shaft, comprising:
   a drag plate configured to be integrally rotatable with the drive shaft and to be pressed by a drag adjustment member, the drag plate comprising a sound generating plate that is configured to oppose the drive gear;
   a sound generating member comprising a head portion configured to contact the sound generating plate, and a shaft portion connected to the head portion; the sound generating member configured to generate a sound by interference between the sound generating plate and the head portion during relative rotation between the drive gear and the drag plate; and
   a housing member configured to be mounted to the drive gear and comprising a holding portion to hold the shaft portion of the sound generating member, and a regulating portion configured to regulate movement of the head portion.

2. The drag device for a dual-bearing reel recited in claim 1, wherein
   the holding portion comprises a hole, and
   the shaft portion is disposed in the hole.

3. The drag device for a dual-bearing reel recited in claim 1, wherein
   the regulating portion is configured to regulate movement of the head portion in a circumferential direction.

4. The drag device for a dual-hearing reel recited in claim 3, wherein the regulating portion comprises a pair of opposing surfaces facing each other in the circumferential direction, and the head portion is disposed between the pair of opposing surfaces.

5. The drag device for a dual-bearing reel recited in claim 4, wherein the regulating portion comprises a pair of protrusions that protrude from the holding portion so as to face each other in the circumferential direction, and the pair of protrusions comprising the opposing surfaces.

6. The drag device for a dual-bearing reel recited in claim 1, further comprising a biasing member configured to bias the sound generating member toward the sound generating plate, the biasing member being disposed in the holding portion.

7. The drag device for a dual-bearing reel recited in claim 6, wherein the holding portion comprises a hole, the shaft portion is disposed in the hole, and the biasing member is disposed between the shaft portion and the hole.

\* \* \* \* \*